(12) United States Patent
Zhou et al.

(10) Patent No.: US 12,418,086 B2
(45) Date of Patent: Sep. 16, 2025

(54) WAVEGUIDE, WAVE BEAM ADJUSTING DEVICE, WAVE BEAM ADJUSTING METHOD AND MANUFACTURING METHOD

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Jian Zhou, Beijing (CN); Feng Qu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/260,543

(22) PCT Filed: Jul. 27, 2022

(86) PCT No.: PCT/CN2022/108353
§ 371 (c)(1),
(2) Date: Jul. 6, 2023

(87) PCT Pub. No.: WO2024/020883
PCT Pub. Date: Feb. 1, 2024

(65) Prior Publication Data
US 2024/0387973 A1    Nov. 21, 2024

(51) Int. Cl.
*H01Q 3/26* (2006.01)
*H01P 3/16* (2006.01)
(Continued)

(52) U.S. Cl.
CPC ............. *H01P 3/16* (2013.01); *H01Q 3/2676* (2013.01); *H01Q 15/02* (2013.01); *H01Q 21/005* (2013.01)

(58) Field of Classification Search
CPC .......... H01P 3/16; H01Q 15/02; H01Q 21/00; H01Q 21/005; H01Q 3/26; H01Q 3/2676; H01Q 21/06; H01Q 3/24
See application file for complete search history.

(56) References Cited

U.S. PATENT DOCUMENTS 3,848,256 A * 11/1974 Craven .................... H01Q 3/22
343/768
4,788,552 A * 11/1988 Karlsson ............ H01Q 21/0043
343/777
(Continued)

FOREIGN PATENT DOCUMENTS

CN       107340612 A     11/2017
CN       109100870 A     12/2018
(Continued)

OTHER PUBLICATIONS

Cabrini, Stefano , "Campanile Near-Field Probes Fabricated by Nanoimprint Lithography", 2017 International Conference on Electromagnetics in Advanced Applications (ICEAA), IEEE, Oct. 12, 2017, pp. 1856-1857.
(Continued)

*Primary Examiner* — Tho G Phan
(74) *Attorney, Agent, or Firm* — Myers Bigel, P.A.

(57) ABSTRACT

The present disclosure provides a waveguide, including: a metallic housing having the shape of a cuboid and an opening disposed in a side thereof, a slow-wave medium accommodated in the metallic housing, feeding probes respectively located at both ends of the metallic housing and inserted into the slow-wave medium through the metallic housing, a slit plate covering the opening of the metallic housing and comprising a plurality of slits, a plurality of diodes and photodetectors disposed on the slit plate corresponding to the slits in a one-to-one relationship, each diode crossing the corresponding slit. The present disclosure also
(Continued)

relates to a wave beam adjusting device comprising the waveguide, a wave beam adjusting method applicable to the wave beam adjusting device, and a method for manufacturing a photodetector applicable to the waveguide.

18 Claims, 11 Drawing Sheets

(51) Int. Cl.
  *H01Q 15/02* (2006.01)
  *H01Q 21/00* (2006.01)

(56) References Cited

U.S. PATENT DOCUMENTS

| | | | | |
|---|---|---|---|---|
| 5,861,845 | A * | 1/1999 | Lee | H01Q 3/22 |
| | | | | 342/374 |
| 7,295,165 | B2 * | 11/2007 | Ferguson | H01Q 13/0266 |
| | | | | 343/705 |
| 8,692,731 | B2 * | 4/2014 | Lee | H01P 3/121 |
| | | | | 343/785 |
| 10,135,148 | B2 | 11/2018 | Stevenson et al. | |
| 10,446,900 | B2 * | 10/2019 | Ouchi | H01P 5/188 |
| 2015/0222014 | A1 | 8/2015 | Stevenson et al. | |
| 2017/0324148 | A1 | 11/2017 | Stevenson et al. | |
| 2019/0334234 | A1 | 10/2019 | Quarfoth et al. | |

FOREIGN PATENT DOCUMENTS

| | | |
|---|---|---|
| CN | 109478715 A | 3/2019 |
| CN | 110034416 A | 7/2019 |
| CN | 110865475 A | 3/2020 |
| CN | 112042060 A | 12/2020 |
| CN | 113654661 A | 11/2021 |
| JP | H07283649 A | 10/1995 |
| WO | 2018088106 A1 | 5/2018 |

OTHER PUBLICATIONS

Zhang, Mengfie, "Research on Beam Conversion Structure Based on Metalens", with translation, Beijing University of Posts and Telecommunications, Thesis for Master Degree, Jun. 8, 2021, 174 pages.

* cited by examiner

WAVEGUIDE, WAVE BEAM ADJUSTING DEVICE, WAVE BEAM ADJUSTING METHOD AND MANUFACTURING METHOD

CROSS-REFERENCE TO RELATED APPLICATIONS

This application is the U.S. national phase entry of International Application No. PCT/CN2022/108353, with an international filing date of Jul. 27, 2022, the entire disclosures of which is incorporated herein by reference.

TECHNICAL FIELD

The present disclosure relates to the field of reconfigurable antennas, and more particularly to a waveguide and a wave beam adjusting device including the waveguide, and also to a wave beam adjusting method applicable to the wave beam adjusting device, as well as a method for manufacturing a photodetector.

BACKGROUND

As for a wireless communication system, an antenna plays a crucial role, and its characteristics can even directly affect the performance of the entire wireless communication system. With the development of science and technology, there are higher and higher requirements for the performance of antennas. In addition to the high requirements for traditional indicators such as gain and polarization, antennas are often required to have characteristics such as low profile, light weight and easy conformality. The concept of the holographic antenna is derived from the principle of optical holography, which is that a target wave interferes with a reference wave to form an interference surface, and then the reference wave irradiates the interference surface to obtain the target wave through inversion. Due to the emergence of metamaterials, it is possible to realize holographic antennas in a microwave band. As a high-gain antenna, the holographic antenna can simultaneously meet the requirements for low profile, light weight, simple processing, low cost, easy conformality, etc., and therefore has a strong potential for development.

In addition, an important aspect of modern antennas is reconfigurability, which can greatly improve the reusability of antennas and reduce the cost and complexity of antenna systems. For instance, if the holographic antenna uses a reconfigurable unit that provides it with reconfigurability, a holographic surface can realize multiple functions such as wave beam scanning, multi-wave beam synthesis and polarization reconfiguration and has a huge application potential.

However, most of conventional holographic antennas use square or circular metallic patch units and cannot be changed for reconfiguration once the structure thereof is fixed. Moreover, since the holographic antenna has a large number of units, or even hundreds or thousands of units in some events, it is very difficult to dynamically adjust and control each of them.

SUMMARY

According to the first aspect of the present disclosure, there is provided a waveguide, including: a metallic housing having the shape of a cuboid and an opening disposed in a side of the metallic housing, the opening having an area smaller than that of the side; a slow-wave medium having a refractive index that is greater than 1, accommodated in the metallic housing and having the shape of a cuboid, and each internal surface of the metallic housing being in contact with a corresponding surface of the slow-wave medium; two feeding probes respectively located at both ends of the metallic housing with each being inserted into the slow-wave medium through the metallic housing; a slit plate covering the opening of the metallic housing and adhering to the slow-wave medium, and disposed to form a metallic layer including a plurality of slits at a side of the slow-wave medium; a plurality of diodes disposed on the slit plate and corresponding to the plurality of slits in a one-to-one relationship, each of the plurality of diodes being disposed to cross the corresponding slit, and a cathode of each of the plurality of diodes being electrically connected with the metallic housing; and a plurality of photodetectors disposed on the slit plate and corresponding to the plurality of diodes in a one-to-one relationship, each of the plurality of photodetectors being electrically connected with an anode of the corresponding diode.

According to some exemplary embodiments of the present disclosure, each of the plurality of diodes is a PIN diode.

According to some exemplary embodiments of the present disclosure, each of the plurality of photodetectors includes a photoelectric conversion module, including a substrate configured to perform a function of support and draw a generated current; a thermoelectric conversion layer located on the substrate and configured to convert received heat into electricity; a thermal conduction layer located on the thermoelectric conversion layer and configured to conduct the received heat to the thermoelectric conversion layer; and a photothermal conversion layer located on the thermal conduction layer and configured to absorb and convert incident light into heat.

According to some exemplary embodiments of the present disclosure, in the photoelectric conversion module, the substrate is formed from silicon; the thermoelectric conversion layer is formed from aluminium nitride; the thermal conduction layer is formed from gold; and the photothermal conversion layer includes a plurality of silver nanoparticles.

According to some exemplary embodiments of the present disclosure, each of the plurality of silver nanoparticles has the shape of a cuboid, and the top and bottom surfaces of the cuboid are squares with a side length ranging from 45 nm to 65 nm and the height of the cuboid ranges from 50 nm to 80 nm.

According to some exemplary embodiments of the present disclosure, each of the plurality of photodetectors further includes an optical lens module configured to make an incident beam converge to generate a focused beam focused on the photothermal conversion layer of the photoelectric conversion module.

According to some exemplary embodiments of the present disclosure, the optical lens module includes a superlens structure, and the superlens structure includes: a disc-shaped substrate that is transparent; a plurality of nanopillars disposed on the surface of the disc-shaped substrate with each being made of titanium dioxide and having a cylindrical shape, a height of 600 nm and a diameter ranging from 40 nm to 200 nm, wherein the diameter of each of the plurality of nanopillars gradually decreases from the center to the edge of the disc-shaped substrate.

According to some exemplary embodiments of the present disclosure, the diameter of each of the plurality of nanopillars gradually decreases in a parabolic form from the center to the edge of the disc-shaped substrate.

According to some exemplary embodiments of the present disclosure, the slit plate includes a transparent substrate and a metallic layer formed on a first side of the transparent substrate and including a plurality of slits, the metallic layer adheres to the slow-wave medium, and the plurality of diodes and the plurality of photodetectors are disposed on a second side, opposite to the first side, of the transparent substrate.

According to some exemplary embodiments of the present disclosure, the transparent substrate is formed from glass.

According to some exemplary embodiments of the present disclosure, the slit plate is a metallic plate including the plurality of slits.

According to some exemplary embodiments of the present disclosure, the slow-wave medium is formed from polytetrafluoroethylene.

According to some exemplary embodiments of the present disclosure, the waveguide further includes at least one support pillar, which passes through the metallic housing and abuts against the slow-wave medium at a side, opposite to the opening, of the metallic housing.

According to some exemplary embodiments of the present disclosure, the plurality of slits are disposed in a row of slits arranged in a straight line form along an extension direction of a long edge of the slit plate, a length L and a width W of each slit, and a periodic distance P between the plurality of slits are determined by the following equations: $L=(\lambda_g/5)\sim(\lambda_g/2)$, $W=L/10$, $P=(\lambda_g/5)\sim(\lambda_g/3)$, $\lambda_g=\lambda/neff$, wherein $\lambda_g$ is the transmission wavelength of an electromagnetic wave in the waveguide, $\lambda$ is the input wavelength of the electromagnetic wave, neff is the equivalent refractive index of the slow-wave medium of the waveguide, and the plurality of slits are parallel to each other along an extension direction of the length of a slit.

According to some exemplary embodiments of the present disclosure, the plurality of slits are disposed in a row of slits arranged in a straight line form along an extension direction of a long edge of the slit plate, with each slit having a length of 5.1 mm and a width of 0.5 mm, a periodic distance between the plurality of slits is 3.9 mm, and the plurality of slits are parallel to each other along an extension direction of the length of a slit.

According to the second aspect of the present disclosure, there is provided a wave beam adjusting device, including: a waveguide according to the first aspect and various exemplary embodiments of the present disclosure; an optical control device including a light emitting diode array including a plurality of light emitting diodes, wherein the plurality of light emitting diodes correspond to the plurality of photodetectors in a one-to-one relationship; a controller configured to individually control the lighting and turning-off of each light emitting diode in the light emitting diode array, and also configured to light up a corresponding light emitting diode in response to a received control signal in a binary form to illuminate a corresponding photodetector.

According to the third aspect of the present disclosure, there is provided a wave beam adjusting method applicable to the wave beam adjusting device according to the second aspect of the present disclosure, including: acquiring the control signal in a binary form; and lighting up a corresponding light emitting diode of the plurality of light emitting diodes in response to the control signal.

According to the fourth aspect of the present disclosure, there is provided a method for manufacturing a photodetector applicable to the applicable of the present disclosure, including: forming a thermoelectric conversion layer on a first substrate; forming a thermal conduction layer on the thermoelectric conversion layer; forming a photothermal conversion layer on the thermal conduction layer; depositing a titanium dioxide layer on a second substrate; patternizing the titanium dioxide layer to generate a superlens structure including a plurality of nanopillars; and bonding the superlens structure with the photothermal conversion layer together by an optical adhesive.

BRIEF DESCRIPTION OF DRAWINGS

With reference to the following drawings, the specific embodiments of the present disclosure will be described in detail so as to enable a more comprehensive knowledge and understanding of more details, features and advantages of the present disclosure, wherein FIG. 1a schematically shows the structure of a waveguide according to an exemplary embodiment of the present disclosure in the form of a perspective view;

FIG. 1c is a schematic circuit principle view of a circled part denoted by A in FIG. 1a;

It should be understood that the contents shown in the drawings are merely illustrative and therefore need not be drawn in proportion. Moreover, in all the drawings, like or similar features are denoted by like or similar reference numerals.

DETAILED DESCRIPTION

The following depiction provides specific details of various exemplary embodiments of the present disclosure so that those skilled in the art can fully understand and implement the technical solutions of the present disclosure.

Figure 1A:
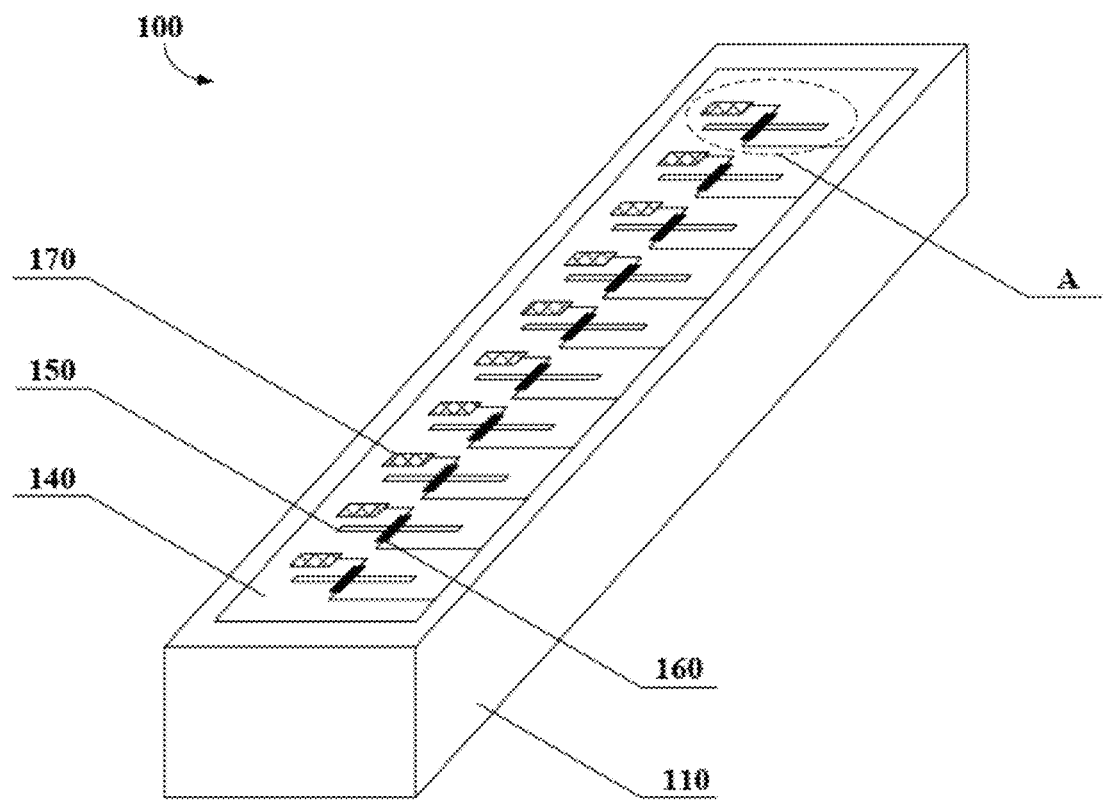
Figure 1B:
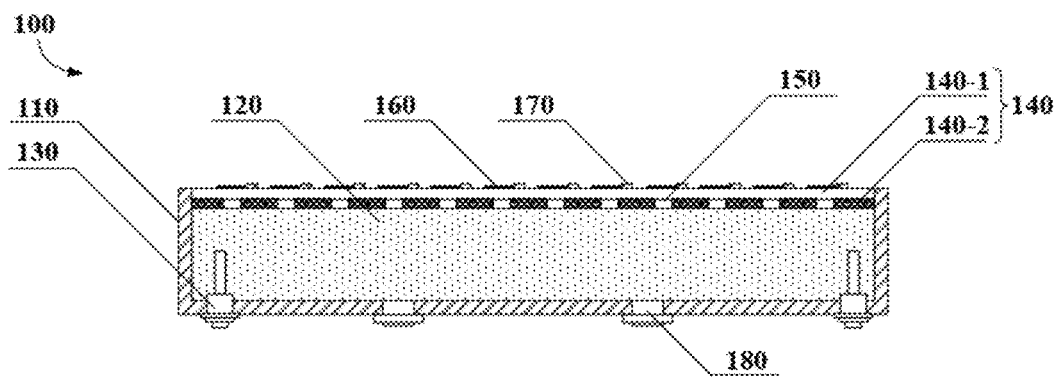
FIG. 1b shows a longitudinal cross-sectional view of the waveguide, as shown in FIG. 1a, taken along the longitudinal axis thereof.

Referring to FIGS. 1a and 1b, they jointly schematically show a structure of a waveguide according to an exemplary embodiment of the present disclosure. FIG. 1a is the perspective view of a waveguide 100, and FIG. 1b is a longitudinal cross-sectional view of the waveguide 100 taken along the longitudinal axis thereof. As shown, the waveguide 100 includes a metallic housing 110, a slow-wave medium 120, two feeding probes 130, a slit plate 140 including a plurality of slits 150, a plurality of diodes 160, a plurality of photodetectors 170 and a plurality of support pillars 180.

The metallic housing 110 has the shape of a cuboid and an opening disposed in a side of the cuboid-shaped metallic housing 110, and the opening has an area smaller than that of the side, provided with the opening, of the metallic housing 110. It should be understood that in the present disclosure, as for a cuboid, the term "side" refers to a surface of the cuboid that is parallel to the longitudinal axis thereof, and the term "end face" refers to a surface of the cuboid that is perpendicular to the longitudinal axis thereof. The metallic housing 110 can be made of any suitable metal with high conductivity. As a non-limiting example, the metallic housing 110 can be made of aluminium or copper. The slow-wave medium 120 is accommodated in the metallic housing 110 and also has the shape of a cuboid, and each internal surface of the metallic housing 110 is in contact with a corresponding surface of the slow-wave medium 120. The slow-wave medium 120 is used to reduce the propagation speed of an electromagnetic wave in the waveguide 100 so as to make the propagation of the electromagnetic wave more stable in the waveguide 100, so the slow-wave medium 120 can be made of a material having a refractive index that is greater than 1. As a non-limiting example, the slow-wave medium 120 can be formed from polytetrafluoroethylene (PTFE). The two feeding probes 130 are respectively located at both ends of the metallic housing 110, and each of the feeding probes 130 passes through the metallic housing 110 to be inserted into the slow-wave medium 120, wherein one feeding probe 130 is used to input the electromagnetic wave into the slow-wave medium 120, and the other feeding probe 130 is used to output the electromagnetic wave from the slow-wave medium 120. It should be understood that FIG. 1b shows that the feeding probes 130 pass through the metallic housing 110 to be inserted into the slow-wave medium 120 from the side, opposite to the opening, of the metallic housing 110. However, it should be understood that the arrangement of the feeding probe 130 as shown in FIG. 1b is merely exemplary and not restrictive. In some exemplary embodiments of the present disclosure, the feeding probes 130 can also pass through the metallic housing 110 to be inserted into the slow-wave medium 120 from other side or end face of the metallic housing 110. The present disclosure does not impose any restriction on how the feeding probes 130 at the end of the metallic housing 110 pass through the metallic housing 110 to be inserted into the slow-wave medium 120, as long as they are respectively located at both ends of the waveguide 100 for inputting and outputting the electromagnetic wave.

The slit plate 140 covers the opening of the metallic housing 110 and is in contact with the corresponding surface of the slow-wave medium 120. Therefore, the slit plate 140 is arranged to form a metallic layer including the plurality of slits 150 above the slow-wave medium 120. In the exemplary embodiment as shown in FIG. 1b, the slit plate 140 can include a transparent substrate 140-1, and a metallic layer 140-2 formed on a first side of the transparent substrate 140-1 and including the plurality of slits 150. As shown in FIG. 1b, the first side of the transparent substrate 140-1 is adjacent to the slow-wave medium 120, and the second side thereof is opposite to the first side and away from the slow-wave medium 120. In the situation as shown in FIG. 1b, the plurality of diodes 160 and the plurality of photodetectors 170 are disposed on the second side of the transparent substrate 140-1, which will be described in detail. In some exemplary embodiments of the present disclosure, the transparent substrate 140-1 can be formed from glass. The metallic layer 140-2 can be formed from any suitable metal with high conductivity. As a non-limiting example, the metallic layer 140-2 can be formed from aluminium, copper, or silver. It should be understood that the structure of the slit plate 140 as shown in FIG. 1b is merely exemplary and not restrictive. According to some other exemplary embodiments of the present disclosure, the slit plate 140 can also be a metallic plate including the plurality of slits 150. Thus, the present disclosure does not impose any restriction on the specific structure of the slit plate 140, as long as it can be arranged to form a metallic layer including the plurality of slits 150 above the slow-wave medium 120. In the exemplary embodiment as shown in FIGS. 1a and 1b, the plurality of slits 150 in the slit plate 140 are disposed in a row arranged in a straight line form along the longitudinal direction of the waveguide 100, and are parallel to each other along the lengthwise extension direction thereof. However, the arrangement of the plurality of slits 150 is merely exemplary and not restrictive. In some other exemplary embodiments of the present disclosure, according to the slit distribution pattern as actually required, the plurality of slits 150 can also be arranged into two or more lines, or in other pattern modes.

According to the present disclosure, in the waveguide 100, the length L and width W of the slit 150, and the periodic distance P between the plurality of slits 150 can be determined by the following equations: $L=(\lambda_g/5)\sim(\lambda_g/2)$, $W=L/10$, $P=(\lambda_g/5)\sim(\lambda_g/3)$, $\lambda_g=\lambda/\text{neff}$, wherein $\lambda_g$ is the transmission wavelength of the electromagnetic wave in the waveguide 100, $\lambda$ is the input wavelength of the electromagnetic wave, neff is the equivalent refractive index of the slow-wave medium 120 of the waveguide 100. It should be explained that the periodic distance between the plurality of slits 150 refers to the distance between identical side edges of two adjacent slits 150 (e.g., identical long edges of two adjacent slits 150 as shown in FIGS. 1*a* and 1*b*). In some exemplary embodiments, the slit 150 in the waveguide 100 can have the length L of 5.1 mm and the width W of 0.5 mm, and the periodic distance between the plurality of slits 150 can be 3.9 mm. It should be understood that from the above equation, it can be known that the length and width of, as well as the period distance between, the slits 150 can all be adjusted accordingly based on the operating frequency range of electromagnetic waves in practical applications.

Figure 1C:
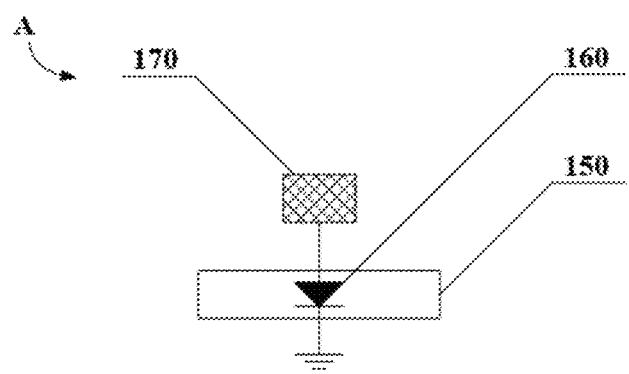

The plurality of diodes 160 and the plurality of photodetectors 170 are disposed on the slit plate 140, and on the second side of the slit plate 140 as shown in FIG. 1*b*. The plurality of diodes 160 correspond to the plurality of slits 150 in a one-to-one relationship, and are each arranged to cross the corresponding slit 150 substantially in the middle of the long edge of the corresponding slit 150. The cathode of each of the plurality of diodes 160 is grounded, such as electrically connected with the metallic housing 110 of the waveguide 100. The plurality of photodetectors 170 correspond to the plurality of diodes 160 in a one-to-one relationship and are each electrically connected with an anode of the corresponding diode 160. FIG. 1*c* shows the circuit principle of a circled part denoted by A in FIG. 1*a*. The part A in FIG. 1*a* includes the slit 150 in the slit plate 140 and the corresponding diode 160 and photodetector 170. As shown in FIG. 1*c*, the diode is arranged to cross the corresponding slit 150 substantially in the middle (this position is not necessary, and a position closer to a side is also possible) of the long edge of the corresponding slit 150, the cathode of the diode 160 is grounded (e.g., the metallic housing 110 of the waveguide 100), and the anode of the diode 160 is electrically connected with the corresponding photodetector 170. It should be understood that the diode 160 can be any suitable diode, and as a non-limiting example, the diode 160 can be a positive-intrinsic-negative diode (i.e., a PIN diode). In some other exemplary embodiments of the present disclosure, the diode 160 may also be a Schottky diode. The present disclosure does not impose any restriction on the specific type of the diode.

As shown in FIG. 1*b*, the waveguide 100 also includes at least one support pillar 180. The at least one support pillar 180 passes through the metallic housing 110 and abuts against the slow-wave medium 120 at a side, opposite to the opening, of the metallic housing 110. The support pillar 180 is used to apply a certain force to the slow-wave medium 120 to keep it in contact with the slit plate 140. However, it should be understood that the supporting pillar 180 is not necessary. In some other exemplary embodiments of this disclosure, the waveguide 100 may also not include the support pillar 180.

In the application process of the waveguide 100, when the photodetector 170 is not illuminated, the diode 160 is in an OFF state, such that the energy of the electromagnetic wave transmitted in the waveguide 100 can be radiated out of the slit 150; however, when the photodetector 170 is illuminated by an optical control device used for driving, the photodetector 170 absorbs an incident light and generates a corresponding current for the diode 160, which can serve as an electrical control signal for the diode 160 that changes the diode 160 from an OFF state to an ON state, in such a way that the current flow across the slit 150 via the diode 160, thereby preventing the energy of the electromagnetic wave transmitted in the waveguide 100 from radiating out the slit 150. Thus, the waveguide 100 according to an exemplary embodiment of the present disclosure can dynamically adjust the slit distribution pattern of the plurality of slits 150 in the waveguide 100 only by optical control so as to realize the dynamic tuning of slit-radiating energy accordingly, without additional wiring on the waveguide 100 to connect a corresponding level controller or circuit, which greatly simplifies the structure and control method of the waveguide. In addition, the waveguide 100 according to an exemplary embodiment of the present disclosure can achieve dynamic tuning of slit-radiating energy by dynamically adjusting the plurality of slits 150. Therefore, during the wave beam adjusting process, different wave beam directions can be achieved by controlling the magnitude of the slit-radiating energy at different positions on a waveguide array, thereby improving the wave beam shaping characteristics. Therefore, the waveguide 100 according to the exemplary embodiment of the present disclosure has reconfigurable characteristics.

Figure 2:
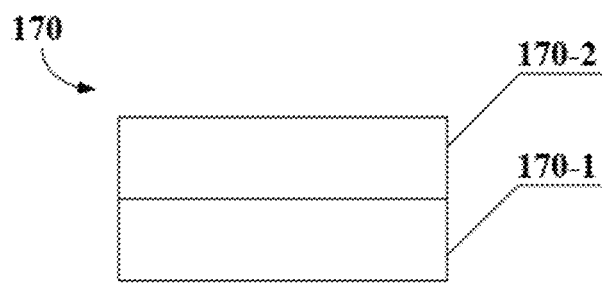
FIG. 2 schematically shows the structure of a photodetector in the waveguide as shown in FIGS. 1a and 1b according to some exemplary embodiments of the present disclosure.

FIG. 2 schematically shows the structure of a photodetector according to the present disclosure in the form of a block diagram, and the photodetector can be applied to the waveguide 100 as shown in FIGS. 1*a* and 1*b*. As shown in FIG. 2, the photodetector 170 can include a photoelectric conversion module 170-1 and an optical lens module 170-2. The photoelectric conversion module 170-1 is configured to absorb an incident light and converts the absorbed incident light into an electric signal, i.e., an electric adjusting signal applicable to the corresponding diode 160. The optical lens module 170-2 is configured to make an incident beam converge to generate a focused beam focused on the photothermal conversion layer of the photoelectric conversion module 170-1, thereby improving the collection effect of the incident light. The optical lens module 170-2 can have any suitable structure, including but not limited to a superlens structure, a microlens array, etc. The present disclosure does not impose any restriction on the specific structure of the optical lens module 170-2. Furthermore, it should be understood that the structure of the photodetector as shown in FIG. 2 is merely exemplary and not restrictive. According to some other exemplary embodiments of the present disclosure, the photodetector can include the photoelectric conversion module 170-1 only, but not the optical lens module 170-2.

Figure 3:
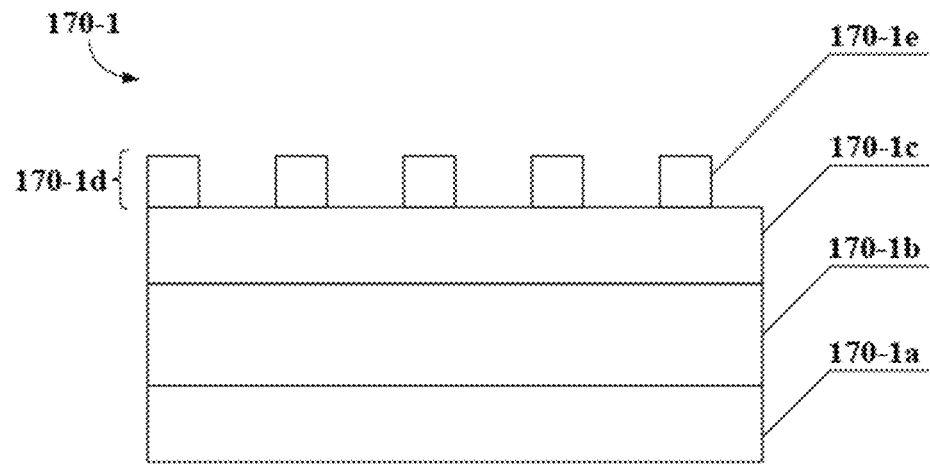
FIG. 3 schematically shows a structure of a photoelectric conversion module in the photodetector as shown in FIG. 2 according to some exemplary embodiments of the present disclosure.

FIG. 3 schematically shows the structure of the photoelectric conversion module in the photodetector as shown in FIG. 2 according to some exemplary embodiments of the present disclosure. As shown in FIG. 3, the photoelectric conversion module 170-1 includes: a substrate 170-1*a*, a thermoelectric conversion layer 170-1*b*, a thermal conduction layer 170-1*c*, and a photothermal conversion layer 170-1*d*. The substrate 170-1*a* is configured to support other layers and output a generated current. The thermoelectric conversion layer 170-1*b* is located on the substrate 170-1*a* and configured to convert received heat into electricity. The thermal conduction layer 170-1*c* is located on the thermoelectric conversion layer 170-1*b* and configured to conduct received heat to the thermoelectric conversion layer 1701*b*. The photothermal conversion layer 170-1*d* is located on the thermal conduction layer 170-1*c* and configured to strongly absorb and convert incident light into heat. Therefore, the photoelectric conversion module 170-1 can absorb the incident light and correspondingly generate a current used for an electric adjusting signal. In some exemplary embodiments, the substrate 170-1*a* can be formed from silicon, the thermoelectric conversion layer 170-1*b* can be formed from aluminium nitride, the thermal conduction layer 170-1*c* can be formed from a metal with high thermal conductivity (such as gold, silver or aluminium), and the photothermal conversion layer 170-1*d* can include a plurality of silver nanoparticles 171-1*e*. The silver nanoparticles 171-1*e* can strongly absorb the incident light to convert it into heat, which will be described in detail below.

Figure 4A:
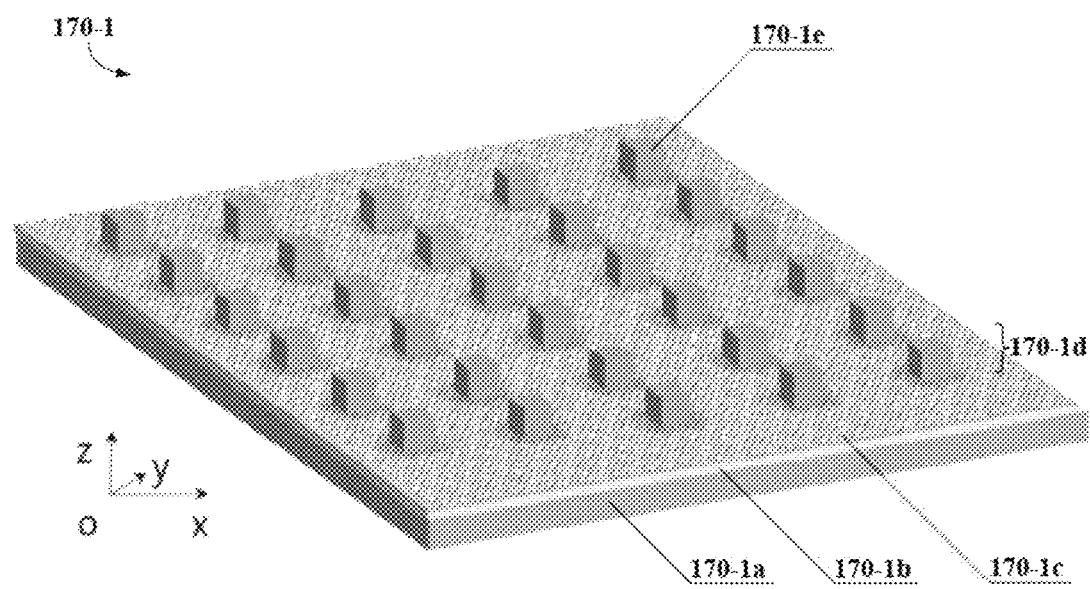
FIG. 4a further schematically shows the details of the photoelectric conversion module as shown in FIG. 3 according to some exemplary embodiments of the present disclosure.

FIG. 4a further schematically shows the details of the photoelectric conversion module as shown in FIG. 3 according to some exemplary embodiments of the present disclosure. The structure of the photoelectric conversion module as shown in FIG. 4a is similar to that of the photoelectric conversion module as shown in FIG. 3, except that the shape of the silver nanoparticles 170-1e is shown in FIG. 4a. Therefore, only the difference will be described below, and other aspects will not be reiterated. As shown in FIG. 4a, each of the plurality of silver nanoparticles 170-1e included in the photoelectric conversion module 170-1 has the shape of a cuboid, and the top and bottom surfaces of the cuboid are squares with a side length ranging from 45 nm to 65 nm and the height of the cuboid ranges from 50 nm to 80 nm.

Figure 4B:
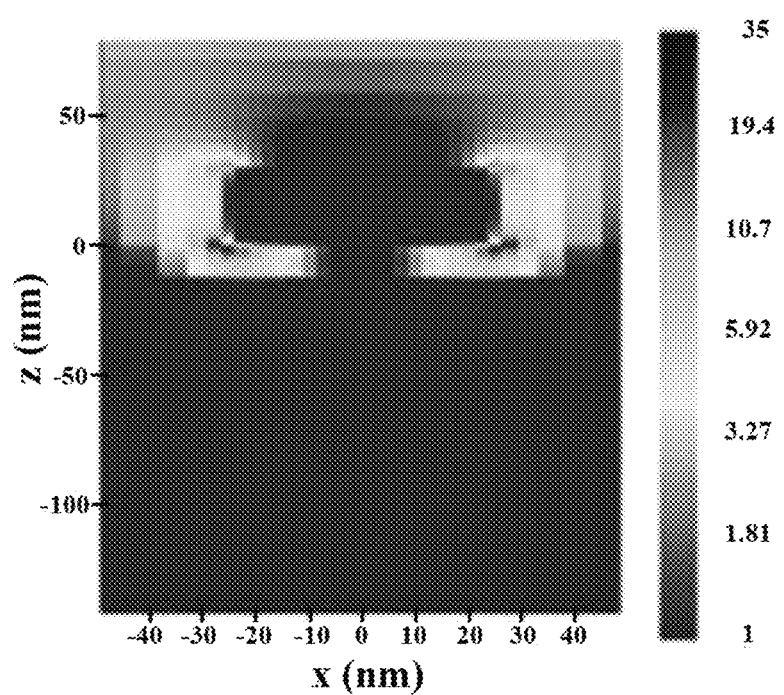
FIGS. 4b, 4c, and 4d schematically show the absorption effect of a photothermal conversion layer including silver nanoparticles, included in the photoelectric conversion module, on an incident light as shown in FIG. 4a in the form of simulation views.
Figure 4C:
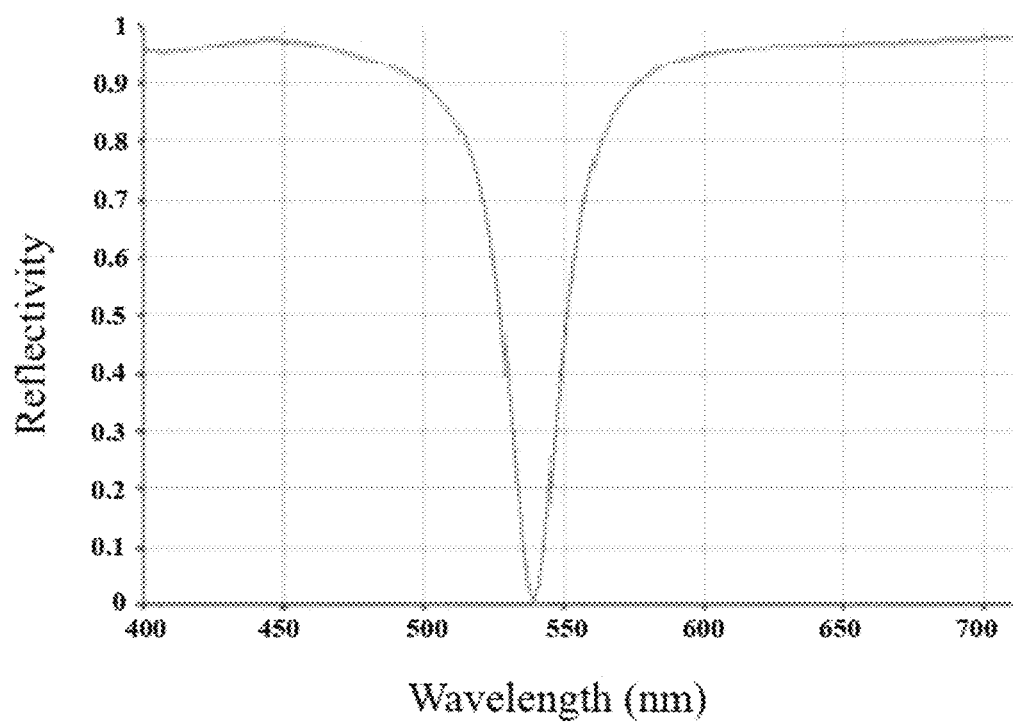
Figure 4D:
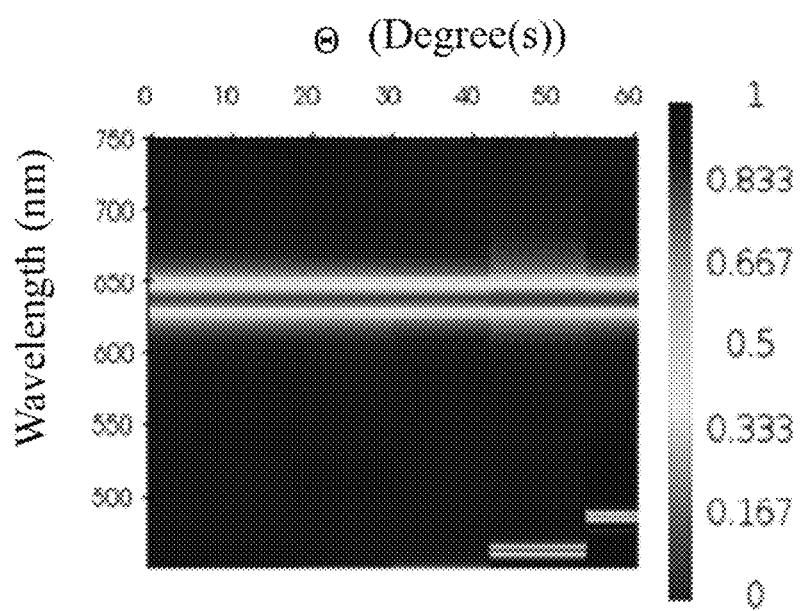

FIGS. 4b, 4c, and 4d are respectively simulation views schematically showing the absorption effect of a photothermal conversion layer including the silver nanoparticles, included in the photoelectric conversion module, on an incident light as shown in FIG. 4a. FIG. 4b shows the simulation result of the absorption effect of a single silver nanoparticle 170-1e in the photoelectric conversion module on the incident light as shown in FIG. 4a. It can be seen therefrom that the single silver nanoparticle 170-1e strongly absorbs the incident light, especially at the position in FIG. 4b where the z-axis is 0 nm, i.e., where the silver nanoparticle 170-1e is combined with the thermal conduction layer 170-1c. The thermal conduction layer 170-1c (usually formed from gold, silver or aluminium) can strongly absorb the incident light due to the strong reflection and transmission-free characteristics thereof. Therefore, the structure composed of the single silver nanoparticle and the substrate has a perfect absorption characteristic. Moreover, FIG. 4c shows the simulation result of the absorption effect of the photothermal conversion layer 170-1d including the silver nanoparticles 170-1e on the incident light with different wavelengths. As shown in FIG. 4c, the photothermal conversion layer 170-1d including the silver nanoparticles 170-1e as shown in FIG. 4a can almost completely absorb light having a wavelength of approximately 540 nm. Finally, FIG. 4d shows the simulation result of the absorption effect of the photothermal conversion layer 170-1d including the silver nanoparticles 170-1e on the incident light irradiated at different angles of incidence. As shown in FIG. 4d, at the angle θ of incidence ranging from 0° (normal incidence) to ±60° (angle of inclination), the absorption rate of the photothermal conversion layer 170-1d including the silver nanoparticles 170-1e remains substantially unchanged and always close to perfect, which can reduce the problems resulting from the changes in lighting angle and therefore greatly enhance the efficiency of light absorption.

Figure 5:
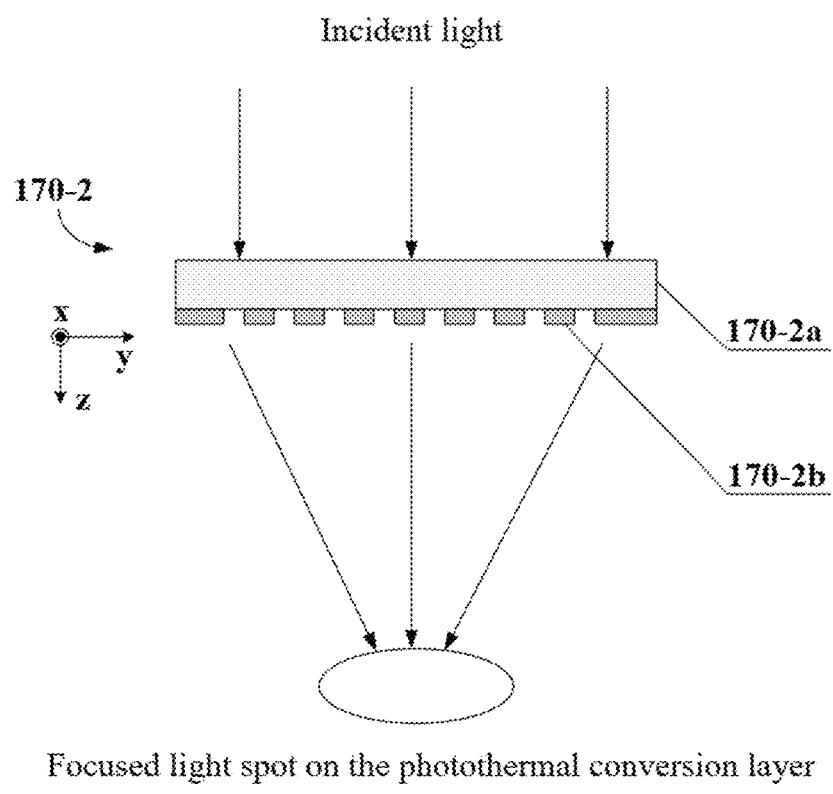
FIG. 5 schematically shows a structure of an optical lens module in the photodetector as shown in FIG. 2 according to some exemplary embodiments of the present disclosure.

FIG. 5 schematically shows a structure of the optical lens module in the photodetector as shown in FIG. 2 according to some exemplary embodiments of the present disclosure. As shown in FIG. 5, the optical lens module 170-2 includes a superlens structure capable of focusing the incident light to converge it into a focused spot on the photothermal conversion layer 17-1d of the photoelectric conversion module, thereby focusing the energy of the incident light on the photothermal conversion layer 170-1d as much as possible so as to greatly improve the incident light beam collection ability. Therefore, the optical lens module 170-2 including the superlens structure achieves a focusing effect similar to that obtained by a convex lens based on a planar layer configuration. The optical lens module 170-2 includes a substrate 170-2a, which has a disc shape and is transparent. The optical lens module 170-2 also includes a plurality of nanopillars 170-2b arranged on the surface of the substrate 170-2a. Each nanopillar 170-2b is made of titanium dioxide, and has a cylindrical shape, a height of 600 nm and a diameter ranging from 40 nm to 200 nm.

Figure 6:
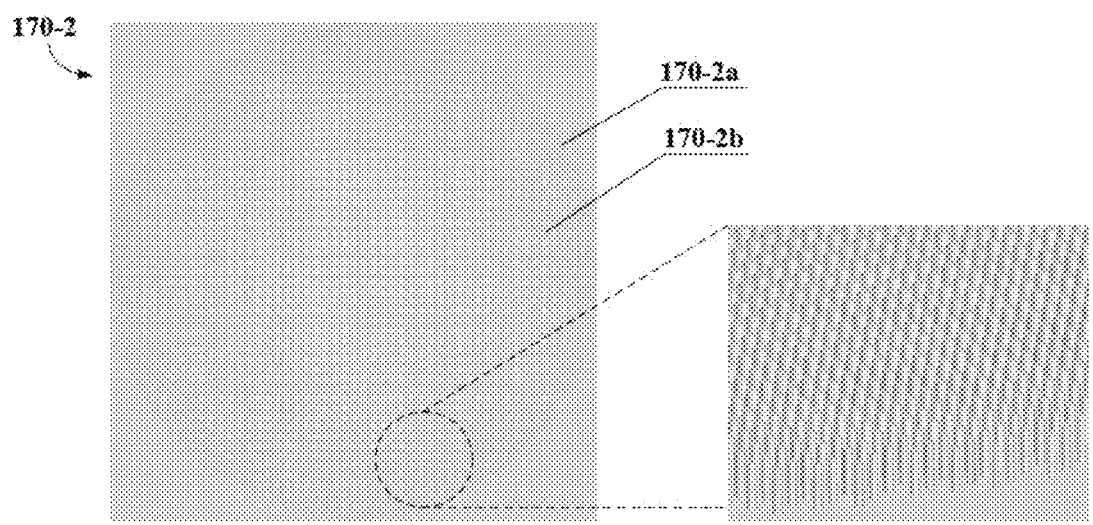
FIG. 6 schematically shows a distribution pattern of nanopillars in the optical lens module as shown in FIG. 5 according to some exemplary embodiments of the present disclosure.

The plurality of nanopillars 170-2b can have a certain distribution pattern on the substrate 170-2a so as to achieve the overall phase distribution required by the optical lens module 170-2. FIG. 6 schematically shows a distribution pattern of the plurality of nanopillars in the substrate. As shown in FIG. 6, the diameter of each of the plurality of nanopillars 170-2b gradually decreases from the center to the edge of the disc-shaped substrate 170-2a. That is to say, the closer to the center of the disc-shaped substrate 170-2a, the larger the diameter of the nanopillar 170-2b; and the closer to the edge of the disc-shaped substrate 170-2a, the smaller the diameter of the nanopillar 170-2b. The graphical contents as shown in FIG. 6 clearly illustrate such a distribution.

Figure 7:
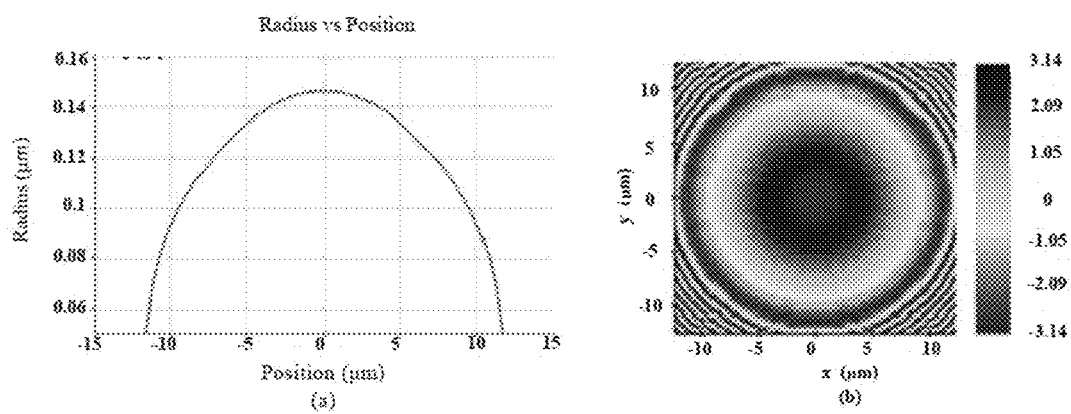
FIG. 7 schematically shows a distribution pattern of nanopillars in the optical lens module as shown in FIG. 5 according to some other exemplary embodiments of the present disclosure.

FIG. 7 schematically shows another distribution pattern of the plurality of nanopillars on the substrate. As shown in FIG. 7, the diameter of each of the plurality of nanopillars 170-2b gradually decreases in a parabolic form from the center to the edge of the disc-shaped substrate 170-2a. The view (a) in FIG. 7 shows the relationship between the radius of each nanopillar 170-2b and the position thereof in the disc-shaped substrate 170-2a, wherein the radius of the nanopillar 170-2b at the center of the circle (namely, 0 μm in the view (a) of FIG. 7) is the largest, and the diameter of each of the plurality of nanopillars 170-2b gradually decreases in a parabolic form from the center to the edge of the circle. The view (b) in FIG. 7 shows the overall phase distribution of the optical lens module 170-2 based on the radius distribution of the nanopillars 170-2b as shown in the view (a). It should be understood that the coordinates x and y in the view (b) of FIG. 7 correspond to the coordinates x and y as shown in FIG. 5.

Figure 8:
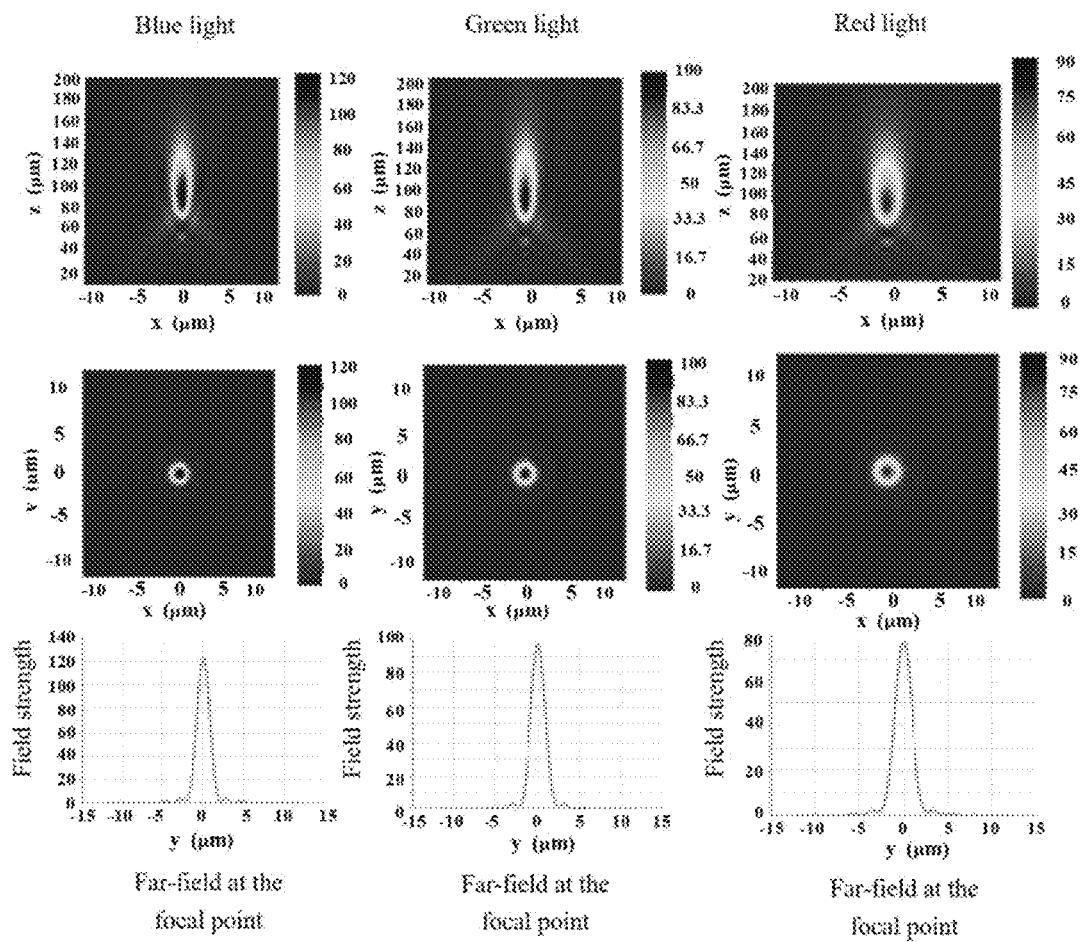
FIG. 8 schematically shows the focusing effect of the optical lens module having the distribution pattern of the nanopillars as shown in FIG. 7 in the form of simulation views.

FIG. 8 schematically shows the focusing effect of the optical lens module having the distribution pattern of the nanopillars as shown in FIG. 7 in the form of simulation views. FIG. 8 shows the blue light, green light and red light focusing effects (such as their spot shapes in the x-z and x-y planes respectively and field strengths at the focal point) of the optical lens module having the nanopillar distribution pattern as shown in FIG. 7 respectively. As shown in these simulation views, the optical lens module can achieve a good incident light focusing effect. Therefore, the optical lens module having the nanopillar distribution pattern as shown in FIG. 7 achieves a focusing effect similar to that obtained by a convex lens based on a planar layer configuration. Furthermore, it should be understood that the coordinates x, y and z in each view of FIG. 8 correspond to the coordinates x, y and z as shown in FIG. 5.

Figure 9:
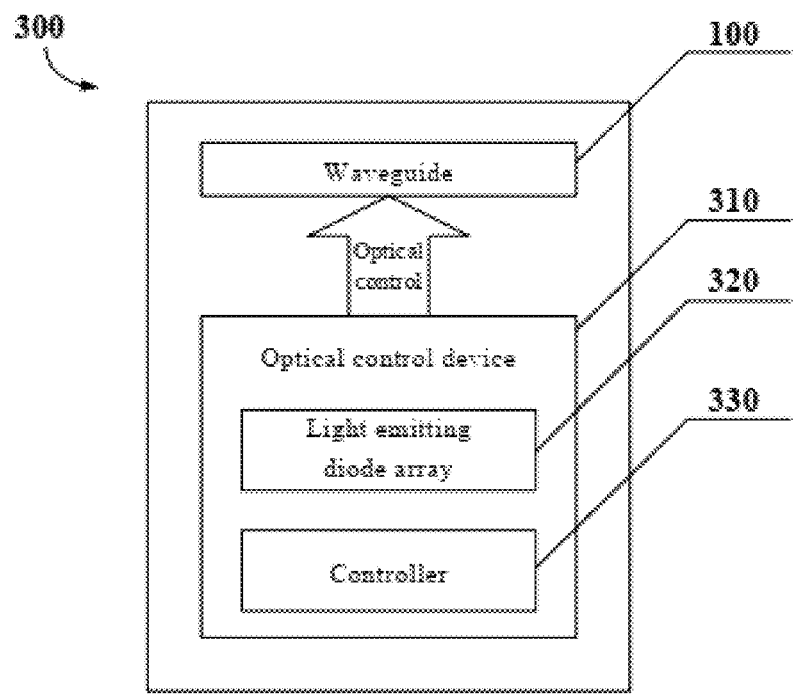
FIG. 9 schematically shows a structure of a wave beam adjusting device according to an exemplary embodiment of the present disclosure in a block diagram.
Figure 10:
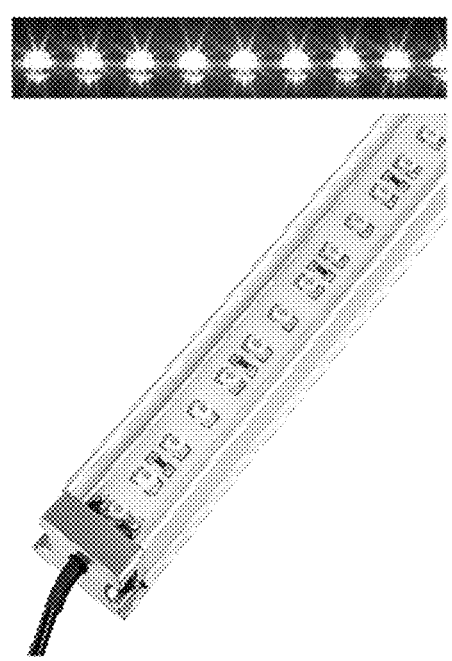
FIG. 10 shows an optical control device and a situation where a light emitting diode in the optical control device is illuminated according to an exemplary embodiment of the present disclosure.
Figure 11:
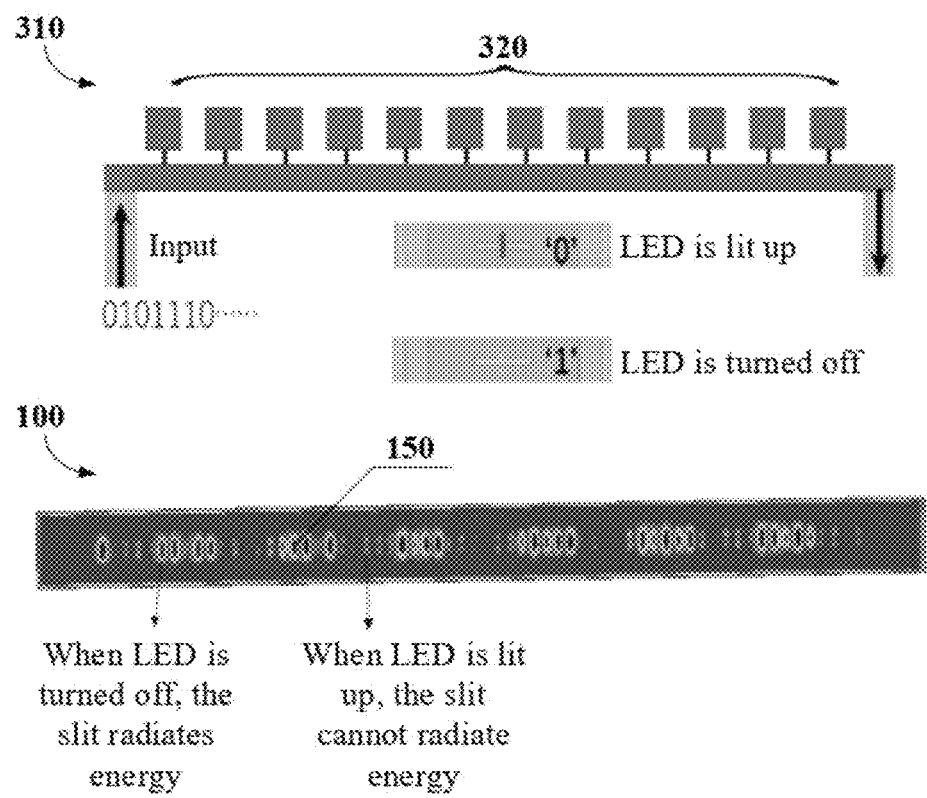
FIG. 11 schematically shows the control of the optical control device as shown in FIG. 10 and the corresponding situation of each slit in the waveguide.

FIG. 9 schematically shows a structure of a wave beam adjusting device according to an exemplary embodiment of the present disclosure in a block diagram. As shown in FIG. 9, the wave beam adjusting device 300 includes the waveguide 100 and the optical control device 310 described above according to FIGS. 1a and 1b. The optical control device 310 includes a light emitting diode array 320 and a controller 330. The light emitting diode array 320 includes a plurality of light emitting diodes, wherein the plurality of light emitting diodes 320 correspond to the plurality of photodetectors 170 of the waveguide 100 in a one-to-one relationship. It should be understood that a light emitting diode of any suitable type can be used to form the light emitting diode array 320, and the present disclosure does not impose any restriction of the specific type of the light emitting diode. The controller 330 is configured to individually control the lighting and turning-off of each light emitting diode in the light emitting diode array 320, and also configured to light up the corresponding light emitting diode in response to a received control signal in a binary form to illuminate the corresponding photodetector 170. FIG. 10 shows the optical control device and a situation where the light emitting diode in the optical control device is illuminated according to an exemplary embodiment of the present disclosure. In the optical control device as shown in FIG. 10, the plurality of light emitting diodes are arranged in a row in a straight line and can emit light under the control of the controller. The optical control device can be configured to perform optical control of the waveguide 100 as shown in FIGS. 1a and 1b. Moreover, FIG. 11 schematically shows the control of the optical control device as shown in FIG. 10 and the corresponding situation of each slit in the waveguide. As shown in FIG. 11, the controller of the optical control device 310 receives a control signal in a binary form, such as the binary numbers "0101110 . . . " as shown. Each of the binary numbers corresponds to a light emitting diode in the light emitting diode array 320. In the situation as shown in FIG. 11, "0" indicates that the corresponding light emitting diode is lit, and "1" indicates that the corresponding light emitting diode is turned off. When the light emitting diode is lit, the corresponding diode 160 is turned on so that a current flows across the slit 150. When the light emitting diode is turned off, the corresponding diode 160 is turned off and no current flows across the slit 150 at this time. The lower view in FIG. 11 shows the situation of each slit 150 in the waveguide 100 based on the control signal in a binary form, wherein the slit 150 corresponding to the lit light emitting diode cannot radiate energy, whereas the slit 150 corresponding to the turned-off light emitting diode can radiate energy.

Based on the holographic principle, the wave beam adjusting device 300 can control the magnitude of the slit-radiating energy at different positions on a waveguide array, so as to control the different directions of the wave beam.

According to the holographic principle, the wave function of a target wave can be expressed as follows:

$$\Psi_{obj}(\vec{r}; \theta_0, \varphi_0) = \exp(-ik_0(\theta_0, \varphi_0) \cdot \vec{r}) \qquad \text{Equation 1}$$

Wherein r represents the distance between the waveguide array and a target wave source, $\theta_0$ is the angle of the direction of the target wave with respect to the horizontal plane, i.e., elevation angle, and $\varphi_0$ is the deflection angle of the direction of the target wave in the horizontal plane.

The wave function of a reference wave can be expressed as follows:

$$\Psi_{ref}(\vec{r}) = \exp(-ik_g \cdot \vec{r}) \qquad \text{Equation 2}$$

Therefore, the following interference pattern of the array can be obtained using the holographic principle:

$$\Psi_{intf} = \Psi_{obj}\Psi_{ref}^* \qquad \text{Equation 3}$$

$$\Psi_{intf}(\vec{r}; \theta_0, \varphi_0) = \exp(-ik_f(\theta_0, \varphi_0) \cdot \vec{r})\exp(ik_g \cdot \vec{r}) \qquad \text{Equation 4}$$

The analysis using an amplitude sampling function is as follows:

$$m(\vec{r}; \theta_0, \varphi_0) = \qquad \text{Equation 5}$$

$$\frac{\text{Re}(\Psi_{intf}(\vec{r}; \theta_0, \varphi_0)) + 1}{2} = \frac{\cos((k_g - k_f(\theta_0, \varphi_0)) \cdot \vec{r}) + 1}{2}$$

Wherein m ($\vec{r}$; $\theta_0$, $\varphi_0$) represents the amplitude of the interference pattern of the array.

A far-field radiation pattern can be calculated by substituting the above amplitude sampling into the following equations.

$$\vec{H}_{rad} = H_0 \frac{\omega^2}{4\pi r} e^{-jkr} \cos\theta \sum_{i=1}^{N} e^{-a_f x_i} m(\vec{r}; \theta_0, \varphi_0) e^{-jk_g x_i} e^{jk_f x_i \sin\varphi} \qquad \text{Equation 6}$$

$$a_f = \frac{\omega\mu_0}{4D_s A_c} \frac{\sin((k_g - k_f(\theta_0, \varphi_0)) \cdot \vec{r})}{\text{Re}\{\eta\}} \qquad \text{Equation 7}$$

In the above equations 6 and 7, $\mu_0$ is the air permeability, $a_f$ is the attenuation, $D_s$ is the spacing between periodic slits, $A_c$ is the cross-sectional area of the rectangular waveguide in the transmission direction, and Re{$\eta$} represents the real part of the wave impedance.

Based on the obtained far-field radiation pattern, binary sampling can be performed to obtain the corresponding binary numbers (i.e., 0 and 1). The binary numbers can be provided as a control signal to the controller 330 of the optical control device 310 for controlling the lighting and turning-off of the plurality of light emitting diodes in the light emitting diode array 320. Correspondingly, the optical control device 310 performs the light control of the waveguide 100 to control the conduction and turn-off of the corresponding diode 160, thereby achieving the control of whether each slit 150 can radiate energy, and ultimately achieving the control of different directions of the wave beam. That is to say, by means of the holographic principle and the binary method, the algorithm calculates different slit distribution patterns, the obtained binary number are inputted as the control signal into the optical control device 310, and the slit distribution pattern on the waveguide 100 can be realized by means of corresponding light, thus controlling the wave beam directions.

Figure 12:
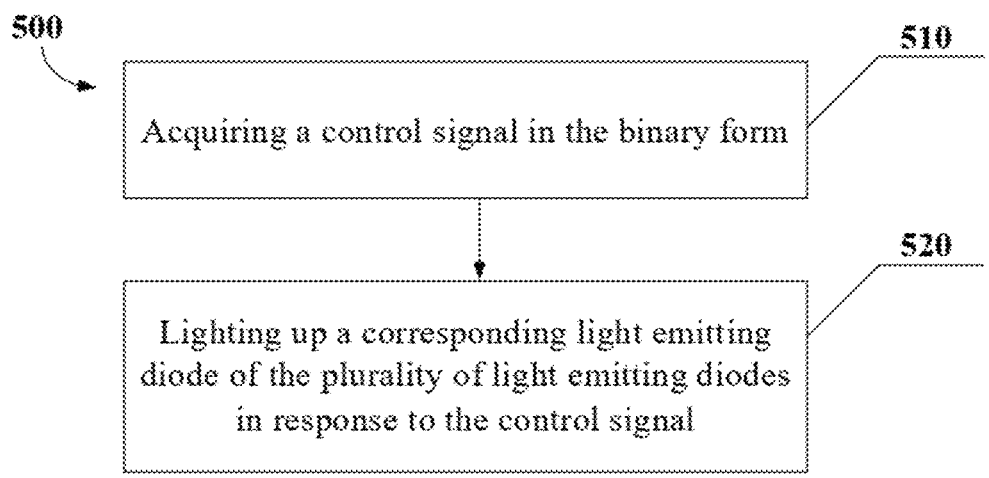
FIG. 12 schematically shows a wave beam adjusting method according to an exemplary embodiment of the present disclosure in the form of a flowchart.

FIG. 12 schematically shows a wave beam adjusting method according to an exemplary embodiment of the present disclosure in the form of a flowchart, and the wave beam adjusting method can be applied to the wave beam adjusting device 300 as shown in FIG. 9. As shown in FIG. 12, the wave beam adjusting method 500 includes steps 510 and 520:

in step 510, acquiring the control signal in a binary form; and in step 520, lighting up a corresponding light emitting diode of the plurality of light emitting diodes in response to the control signal.

The wave beam adjusting method 500 can be applied to the wave beam adjusting device 300 as shown in FIG. 9. Thus, when the corresponding light emitting diode of the plurality of light emitting diode is lit up based on the control signal in the binary form, the waveguide 100 of the wave beam adjusting device 300 is driven by the corresponding light such that the plurality of slits 150 included therein are opened (namely, energy radiation is allowed) and closed (namely, energy radiation is prohibited) correspondingly to generate a corresponding slit distribution pattern, thereby realizing the control of different directions of the wave beam.

Figure 13:
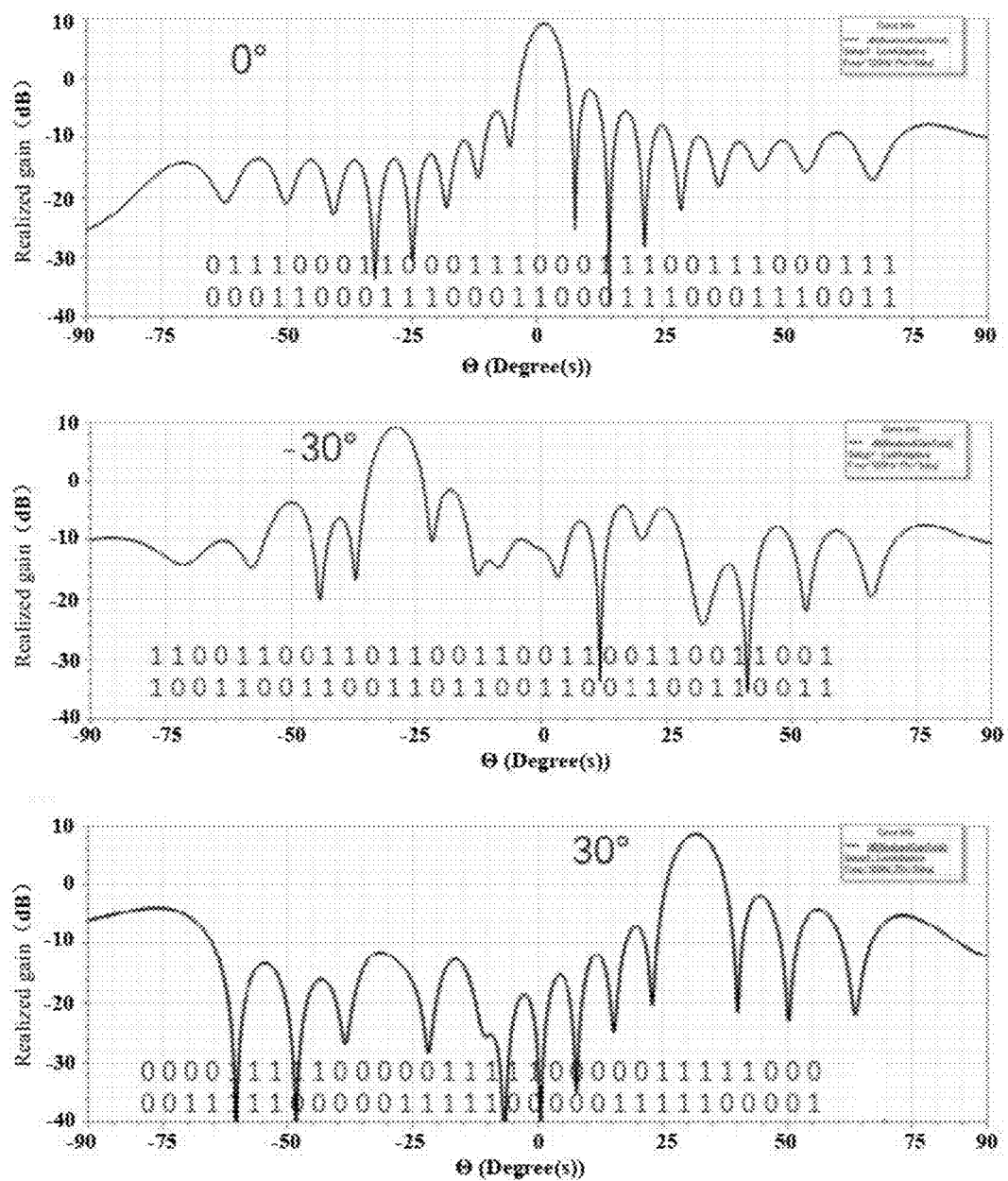
FIG. 13 schematically shows the control of wave beam direction at three angles in the form of simulation views.

FIG. 13 schematically shows the control of the wave beam direction at three angles in the form of simulation views. As previously described in detail, by means of the holographic principle and the binary method, the algorithm calculates different slit distribution patterns, the binary numbers corresponding to different wave beam directions can be obtained, and the binary numbers can be provided as a control signal to the optical control device so as to realize the control of the slit in the waveguide, thereby realizing the control of the wave beam directions. In the simulation views shown in FIG. 13, different slit energy intensity distributions are simulated by means of HFSS to obtain the following three directional angles: −30°, 0°, and 30°, the slits of the waveguide are arranged in a single row in a straight line form and the total number of the slits is 64. For each angle, the top 10 distributions of the binary numbers are 11001001100 . . . , 0111001110 . . . , 000011110 . . . (reference can be made to the corresponding view in FIG. 13 for the specific binary numbers). The three simulated radiation patterns are respectively shown in the three views in FIG. 13.

Figure 14:
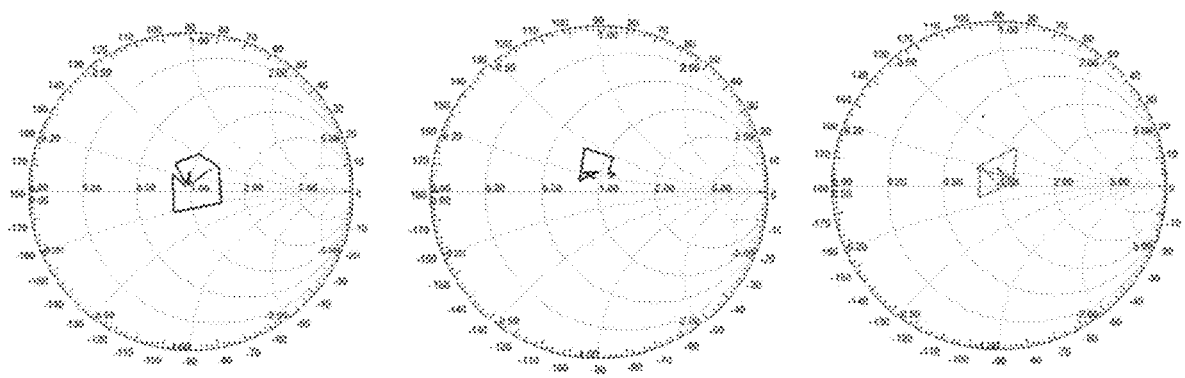
FIG. 14 schematically shows Smith charts corresponding to the wave beam directions at three angles as shown in FIG. 13.

FIG. 14 schematically shows Smith charts corresponding to the wave beam directions at three directional angles as shown in FIG. 13. As shown in FIG. 14, in the Smith charts corresponding to the three directional angles, each plot is located at the central area of the circular graph, which indicates that the waveguide designed according to the principle of the present disclosure realizes the perfect port impedance matching in a specific frequency range, thereby ensuring efficient energy input.

Figure 15:
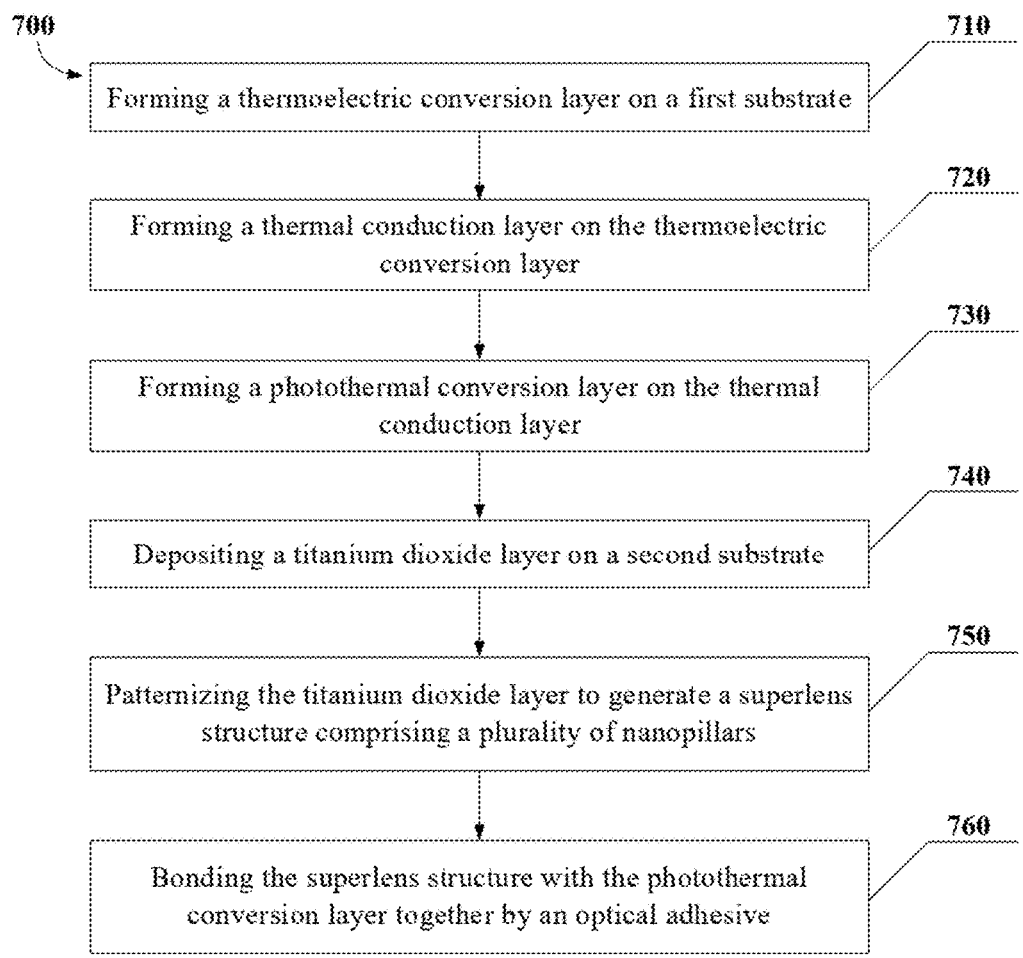
FIG. 15 schematically shows a method for manufacturing a photodetector according to an exemplary embodiment of the present disclosure in the form of a flowchart.

FIG. 15 schematically shows a method for manufacturing a photodetector according to an exemplary embodiment of the present disclosure in the form of a flowchart, and the photodetector is for example the photodetector 170 as shown in FIG. 2 and therefore can be applied to the waveguide according to the present disclosure. As shown in FIG. 15, the manufacturing method 700 includes steps 710, 720, 730, 740, 750 and 760:

in step 710, forming a thermoelectric conversion layer on a first substrate;

in step 720, forming a thermal conduction layer on the thermoelectric conversion layer;

in step 730, forming a photothermal conversion layer on the thermal conduction layer;

in step 740, depositing a titanium dioxide layer on a second substrate;

in step 750, patternizing the titanium dioxide layer to generate a superlens structure including a plurality of nanopillars; and in step 760, bonding the superlens structure with the photothermal conversion layer together by an optical adhesive.

It should be understood that the steps 710, 720 and 730 of the manufacturing method 700 are used for manufacturing a photoelectric conversion module, such as the photoelectric conversion module 170-1, and the steps 740 and 750 of the manufacturing method 700 are used for manufacturing an optical lens module, such as the photoelectric lens module 170-2, including a superlens structure. According to some exemplary embodiments of the present disclosure, the first substrate can be formed from silicon, the thermoelectric conversion layer can be formed from aluminium nitride, the thermal conduction layer can be formed from gold, and the photothermal conversion layer can include a plurality of silver nanoparticles. In addition, the thermal conduction layer can also be formed from silver or aluminium, as long as it has good thermal conductivity. The second substrate can also be formed from silicon. In step 760, the optical adhesive can be polymethyl methacrylate (PMMA). However, it should be understood that any suitable optical adhesive can be used in the manufacturing method according to the present disclosure, and the present disclosure does not impose any restriction on the specific type of the optical adhesive.

Figure 16:
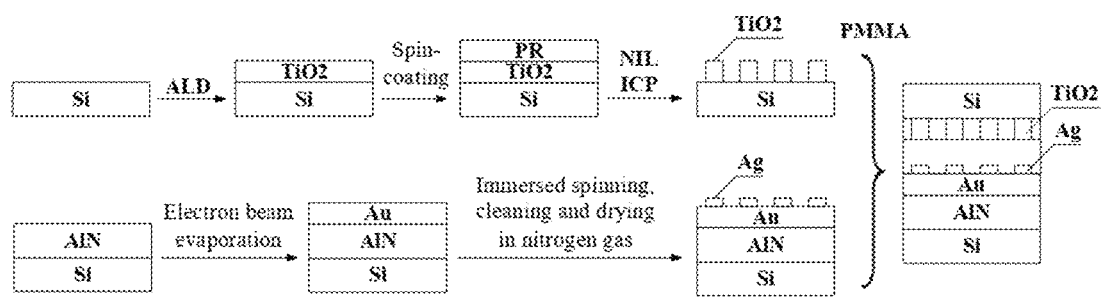
FIG. 16 schematically shows a processing flow for manufacturing a photodetector according to an exemplary embodiment of the present disclosure.

FIG. 16 schematically shows a processing flow for manufacturing a photodetector according to an exemplary embodiment of the present disclosure. The photodetector manufactured using the processing flow corresponds to the photodetector as shown in FIG. 2, including an optical lens module and a photoelectric conversion module. As shown in FIG. 16, in order to manufacture the optical lens module, a titanium dioxide layer is formed on the surface of the silicon substrate by means of an atomic layer deposition process (namely, ALD), a photoresist layer (namely, PR layer) is formed on the surface of the titanium dioxide layer by means of the spin-coating process, and finally the titanium dioxide layer is patternized to form a plurality of nanopillars by means of the nano-imprint lithography (NIL) and the inductively coupled plasma (ICP) etching process, thereby manufacturing the optical lens module; in order to manufacture the photoelectric conversion module, a gold layer is formed on a silicon+aluminium nitride substrate by means of an electron beam evaporation plating process, and then a plurality of silver nanoparticles are formed on the gold layer by immersed spinning, cleaning and drying (namely, point-spin-coating) in nitrogen gas, thereby forming a photoelectric conversion module; and finally, the side of the photoelectric conversion module point-spin-coated with the silver nanoparticles is adhered to the side of the optical lens module including the plurality of nanopillars by means of PMMA, thereby forming a photodetector. It should be understood that the photodetector manufactured by the processing flow in FIG. 16 can be applied to the waveguide according to the various exemplary embodiments of the present disclosure, such as the waveguide 100 as shown in FIGS. 1a and 1b.

Terms used herein are only used to describe the embodiments of the present disclosure, and are not intended to limit the present disclosure. As used herein, the singular forms of "a", "an", "the" and "said" are also intended to include the plural forms, unless otherwise specified clearly. It shall also be further understood that the terms "comprise" and/or "include" used in present disclosure indicate the presence of the features, but do not exclude the presence or addition of one or more other features. The term "and/or" used herein includes any and all combinations of one or more related items as listed. Although the terms "first", "second", "third", etc. can be used to describe various features herein, these features should not be limited by these terms. These terms are only used to distinguish one feature from another.

It should be understood that reference shall be made to the directional arrangement shown in the drawings for the directional terms, such as "up", "down", "left", "right", "top" and "bottom", used in the present disclosure, unless otherwise clearly defined in the present disclosure.

Unless otherwise defined, all terms (including technical terms and scientific terms) used herein have the same meaning as commonly understood by one having ordinary skills in the art, to which the present invention belongs. It should be further understood that terms such as those defined in a common dictionary should be construed as having the same meaning as in the pertinent field or in the context of the specification, and will not be construed in an ideal or overly formal sense, unless defined explicitly as such herein.

In the depiction of the present disclosure, expressions such as "an embodiment", "some embodiments", "examples", "specific examples" or "some examples" are intended to mean that specific features, structures, materials or characteristics described with reference to the embodiments or examples are contained in at least one embodiment or example of the present disclosure. In the present disclosure, schematic descriptions with respect to the above expressions herein do not have to be directed to the same embodiments or examples herein. Instead, specific features, structures, materials or characteristics described thereby may be combined in a suitable manner in any one or more embodiments or examples. Besides, where no contradiction is caused, one skilled in the art may combine and assemble different embodiments or examples described in the specification and features of different embodiments or examples of the present disclosure.

It should be understood that the steps of the method shown in the flowchart or otherwise described herein are only exemplary, and do not mean that the steps of the method shown or described must be executed according to the steps shown or described. On the contrary, the steps of the method shown in the flowchart or otherwise described herein may be executed in a different order from that in the present disclosure or executed simultaneously. In addition, the steps of the method shown in the flowchart or otherwise described herein may also include other additional steps as required.

Although the present disclosure has been described in detail in connection with some exemplary embodiments, it is not intended to be limited to the specific forms described herein. On the contrary, the scope of the present disclosure is limited only by the appended claims.

What is claimed is:

1. A waveguide, comprising:
    a metallic housing having a shape of a cuboid and an opening disposed in a side of the metallic housing, the opening having an area smaller than that of the side;
    a slow-wave medium having a refractive index that is greater than 1, accommodated in the metallic housing and having the shape of a cuboid, wherein each internal surface of the metallic housing is in contact with a corresponding surface of the slow-wave medium;
    two feeding probes respectively located at both ends of the metallic housing with each inserted into the slow-wave medium through the metallic housing;
    a slit plate covering the opening of the metallic housing and adhering to the slow-wave medium, and disposed to form a metallic layer comprising a plurality of slits at a side of the slow-wave medium;
    a plurality of diodes disposed on the slit plate and corresponding to the plurality of slits in a one-to-one relationship, each of the plurality of diodes crosses the corresponding slit, and a cathode of each of the plurality of diodes is electrically connected with the metallic housing; and
    a plurality of photodetectors disposed on the slit plate and corresponding to the plurality of diodes in a one-to-one relationship, wherein each of the plurality of photodetectors is electrically connected with an anode of the corresponding diode.

2. The waveguide according to claim 1, wherein each of the plurality of diodes is a PIN diode.

3. The waveguide according to claim 1, wherein each of the plurality of photodetectors comprises a photoelectric conversion module, comprising:
    a substrate configured to perform a function of support and draw a generated current;
    a thermoelectric conversion layer located on the substrate and configured to convert received heat into electricity;
    a thermal conduction layer located on the thermoelectric conversion layer and configured to conduct the received heat to the thermoelectric conversion layer; and
    a photothermal conversion layer located on the thermal conduction layer and configured to absorb and convert incident light into heat.

4. The waveguide according to claim 3,
    wherein the substrate is formed from silicon,
    wherein the thermoelectric conversion layer is formed from aluminum nitride,
    wherein the thermal conduction layer is formed from gold, and
    wherein the photothermal conversion layer comprises a plurality of silver nanoparticles.

5. The waveguide according to claim 4, wherein each of the plurality of silver nanoparticles has the shape of a cuboid, and top and bottom surfaces of the cuboid are squares with a side length ranging from 45 nm to 65 nm and a height of the cuboid ranges from 50 nm to 80 nm.

6. The waveguide according to claim 3, wherein each of the plurality of photodetectors further comprises an optical lens module configured to make an incident beam converge to generate a focused beam focused on the photothermal conversion layer of the photoelectric conversion module.

7. The waveguide according to claim 6, wherein the optical lens module comprises a superlens structure, and the superlens structure comprises:
    a disc-shaped substrate that is transparent; and
    a plurality of nanopillars disposed on the surface of the disc-shaped substrate with each made of titanium dioxide and having a cylindrical shape, a height of 600 nm and a diameter ranging from 40 nm to 200 nm, wherein the diameter of each of the plurality of nanopillars gradually decreases from a center to an edge of the disc-shaped substrate.

8. The waveguide according to claim 7, wherein the diameter of each of the plurality of nanopillars gradually decreases in a parabolic form from the center to the edge of the disc-shaped substrate.

9. A method for manufacturing a photodetector applicable to the waveguide according to claim 7, comprising:
   forming a thermoelectric conversion layer on a first substrate;
   forming a thermal conduction layer on the thermoelectric conversion layer;
   forming a photothermal conversion layer on the thermal conduction layer;
   depositing a titanium dioxide layer on a second substrate;
   patternizing the titanium dioxide layer to generate a superlens structure comprising a plurality of nanopillars; and
   bonding the superlens structure with the photothermal conversion layer together by an optical adhesive.

10. The waveguide according to claim 1, wherein the slit plate comprises a transparent substrate and a metallic layer formed on a first side of the transparent substrate and comprising a plurality of slits, the metallic layer adheres to the slow-wave medium, and the plurality of diodes and the plurality of photodetectors are disposed on a second side, opposite to the first side, of the transparent substrate.

11. The waveguide according to claim 10, wherein the transparent substrate is formed from glass.

12. The waveguide according to claim 1, wherein the slit plate is a metallic plate comprising the plurality of slits.

13. The waveguide according to claim 1, wherein the slow-wave medium is formed from polytetrafluoroethylene.

14. The waveguide according to claim 1, further comprising at least one support pillar, which passes through the metallic housing and abuts against the slow-wave medium at a side, opposite to the opening, of the metallic housing.

15. The waveguide according to claim 1, wherein the plurality of slits are disposed in a row of slits arranged in a straight line form along an extension direction of a long edge of the slit plate, a length L and a width W of each slit, and a periodic distance P between the plurality of slits are determined by the following equations:

$$L = (\lambda_g/5) \sim (\lambda_g/2),$$
$$W = L/10,$$
$$P = (\lambda_g/5) \sim (\lambda_g/3),$$
$$\lambda_g = \lambda/neff,$$

wherein $\mu_g$ is a transmission wavelength of an electromagnetic wave in the waveguide, $\Delta$ is an input wavelength of the electromagnetic wave, neff is an equivalent refractive index of the slow-wave medium of the waveguide, and the plurality of slits are parallel to each other along an extension direction of the length of a slit.

16. The waveguide according to claim 1, wherein the plurality of slits are disposed in a row of slits arranged in a straight line form along an extension direction of a long edge of the slit plate, with each slit having a length of 5.1 mm and a width of 0.5 mm, a periodic distance between the plurality of slits is 3.9 mm, and the plurality of slits are parallel to each other along an extension direction of the length of a slit.

17. A wave beam adjusting device, comprising:
   a waveguide according to claim 1;
   an optical control device, comprising:
      a light emitting diode array comprising a plurality of light emitting diodes, wherein the plurality of light emitting diodes correspond to the plurality of photodetectors in a one-to-one relationship; and
      a controller configured to individually control the lighting and turning-off of each light emitting diode in the light emitting diode array, and also configured to light up a corresponding light emitting diode in response to a received control signal in a binary form to illuminate a corresponding photodetector.

18. A wave beam adjusting method applicable to the wave beam adjusting device according to claim 17, comprising:
   acquiring the control signal in a binary form; and
   lighting up a corresponding light emitting diode of the plurality of light emitting diodes in response to the control signal.

* * * * *